United States Patent Office 3,181,954
Patented May 4, 1965

3,181,954
FUMARIC ACID-CONTAINING COMPOSITION
Yukio Inoue and Masaki Mitsuno, Hikari, Japan, assignors to Takeda Chemical Industries, Ltd., Osaka, Japan
No Drawing. Filed Sept. 30, 1963, Ser. No. 312,353
Claims priority, application Japan, Oct. 2, 1962, 37/43,884
3 Claims. (Cl. 99—78)

The present invention relates to an improved method for shortening the time required for the complete dissolution of fumaric acid in cold water, and more particularly to a method for preparing a fumaric acid-containing composition soluble readily in cold water, said composition being comprised of an aqueous solution of sorbitol and fumaric acid powder.

As is widely known, fumaric acid has been used as an acidulant in foods and beverages owing to its having a peculiar acid flavor. However, fumaric acid itself if not readily dissolved in cold water, and to make the matter worse, any hitherto known composition containing fumaric acid is liable to separate into solid layer and liquid layer in storage for a long period when it is mixedly present in foods or bevarages. Therefore, the uses of fumaric acid can not but to be limited to a considerable extent at the present stage. The solubility and storage problems have always been of great concern to those skilled in the art.

Although many attempts were made to overcome the foregoing difficulties, none, as far as the present inventors are aware, was successful from the commercial point of view when carried into practice on an industrial scale.

It has now been discovered that the time required for dissolving fumaric acid in cold water can be shortened by mixing an aqueous solution of sorbitol with fumaric acid powder.

It is an object of the present invention to provide a fumaric acid composition which can be readily dissolved in cold water. Another object of the present invention is to provide a method for preparing a fumaric acid composition which can readily and easily dissolve in cold water. It is also the purpose of the invention to provide a fumaric acid composition which is readily and easily soluble in cold water and is stable even if stored for extended periods of time. Among the further objects of the present invention is the provision of an application of fumaric acid to foods and beverages.

The embodiment of the present invention is to admix fumaric acid powder with an aqueous solution of sorbitol. In preparing the fumaric acid composition of the present invention, fumaric acid is preferably ground into a fine powder. The fine powder of about 200 to 500 mesh is desirable and more preferably about 300 to 500 mesh. The thus-ground fumaric acid may then be mixed with an aqueous solution of sorbitol. The concentration of sorbitol in the solution is desirably about 50 to 85% by weight. In the case that a sorbitol solution of less than about 30% is put to use, fumaric acid is ready to separate from water and become unstable.

The sorbitol solution to be used for preparation of the present composition is desirable to be in such an amount as sufficient to wet the fumaric acid powder. For each part by weight of fumaric acid about 0.5 to 1.50 part by weight of an aqueous sorbitol solution may preferably be employed. It is preferred when mixing the aqueous sorbitol solution with fumaric acid powder that the mixing be carried out at room temperature or above.

Thus obtained fumaric acid composition of the present invention will be readily and easily soluble in cold water and be stable even if stored for extended periods of time. Therefore the fumaric acid composition of the present invention can conveniently be employed wherever it is desired to utilize fumaric acid in cold water where fumaric acid is required to dissolve rapidly, and can widely be employed as an acidulant in foods and beverages.

The time in which the fumaric acid-containing composition of the present invention completely dissolves in cold water is shown in the following experiment. "Mesh" in the present specification is that of Tyler standard sieve.

*Experiment*

Each of three kinds of samples mentioned in the following table is respectively put into 1000 ml. shake flasks. After the addition of 500 ml. of water (20° C.) into each flask at a room temperature of 20° C., the flasks are shaken at width of 150 mm. and at 0.5 cycle per second and the time required for the solubility of each sample was observed.

Samples:                                    Time required for complete
                                                    dissolution
  300 mesh fumaric acid (1 g.)_____More than 300
                                                      seconds.
  300 mesh fumaric acid (1 g.)+
    water (1 g.)_____120 seconds.
  300 mesh fumaric acid (1 g.)+
    75% aqueous sorbitol solution
    (1 g.) _____40 seconds.

In the above experiment, abbreviations "g." "ml." and "mm." mean gram(s), milliliters and millimeters, respectively.

For the purpose of giving those skilled in the art a better understanding of the invention, the following illustrative example is given.

*Example*

One hundred parts by weight of 300 mesh fumaric acid powder were thoroughly kneaded with one hundred parts by weight of 75% aqueous solution of sorbitol under heating up to 40° C., as occasion demands. The obtained product was stable without separating into two layers even if kept standing for 60 days at room temperature, and it dissolved in cold water rapidly.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

Having thus disclosed the invention, what is claimed is:

1. A fumaric acid-containing composition soluble readily in cold water, which comprises 0.5–1.50 parts by weight of a 30 to 85% solution of sorbitol and one part by weight of 200 to 500 mesh fumaric acid powder.

2. A fumaric acid-containing composition soluble readily in cold water, which comprises 0.5–1.50 parts by weight of 50 to 85% aqueous solution of sorbitol and one part by weight of 300 mesh fumaric acid powder.

3. A fumaric acid-containing composition soluble readily in cold water, which comprises one part by weight of 75% aqueous solution of sorbitol and one part by weight of 300 mesh fumaric acid powder.

References Cited by the Examiner
UNITED STATES PATENTS 2,332,735  10/43  Lyons _____ 99—78
3,009,810  11/61  Raffensperger et al. _____ 99—78
3,009,811  11/61  Raffensperger et al. _____ 99—78

A. LOUIS MONACELL, *Primary Examiner.*